United States Patent [19]

Pabsch

[11] Patent Number: 6,112,458
[45] Date of Patent: Sep. 5, 2000

[54] PROCESSING OF SEWAGE SLUDGE INTO HUMUS

[76] Inventor: Joachim Pabsch, Thüringer Strasse 4, D-31139 Hildesheim, Germany

[21] Appl. No.: 09/142,543
[22] PCT Filed: Jan. 7, 1998
[86] PCT No.: PCT/DE98/00011
  § 371 Date: May 6, 1999
  § 102(e) Date: May 6, 1999
[87] PCT Pub. No.: WO98/30505
  PCT Pub. Date: Jul. 16, 1998

[30] Foreign Application Priority Data

Jan. 10, 1997 [DE] Germany .............. 197 00 434

[51] Int. Cl.[7] ................ A01B 79/02; C05F 11/08; C02F 3/32
[52] U.S. Cl. ............... 47/58.1; 71/9; 210/602
[58] Field of Search ............... 47/58.1, 68; 71/9, 71/10; 210/602

[56] References Cited

U.S. PATENT DOCUMENTS 4,317,671  3/1982  Willisch ................. 71/9
5,174,897  12/1992  Wengrzynek ................. 210/602

FOREIGN PATENT DOCUMENTS 41 42 085  6/1993  Germany ................. 71/9
43 23 610  2/1995  Germany ................. 71/9

OTHER PUBLICATIONS

Bencsik et al., Acclerated Degradation of Toxic Compounds . . . Grass Cultivation, Abstract, Sep. 1996.

*Primary Examiner*—Peter M. Poon
*Assistant Examiner*—Francis T. Palo
*Attorney, Agent, or Firm*—Dorsey & Whitney LLP

[57] ABSTRACT

The invention describes a process for the conversion of sewage sludge to humus by a complete filling cycle in a way that in a first cycle a primary polder is filled up to a stated height with sewage sludge. After that, the water content of the liquid sewage sludge in the primary polder is reduced, preferably by drainage, and a seeding with fast-growing plants with fine roots, preferably grass, is carried out. The plants in the primary polder are then subjected to a period of growth that concludes the first cycle. It is possible to use several polders parallel at different stages of the cycle. One cycle takes approximately 12 months.

5 Claims, 3 Drawing Sheets

PROCESSING OF SEWAGE SLUDGE INTO HUMUS

BACKGROUND ART

The invention concerns a process for the conversion of sewage sludge to humus as well as a polder for the carrying out of the process.

Large parts of the population have reservations concerning the use of sewage sludge as a fertilizer and for the improvement of the ground. Although legislation attempts to ensure the general public that there are ordinances for indirect polluters of public sewage sludge, parts of the public fear an accumulation of harmful substances in the ground.

Furthermore, the surplus sludge of the waste water treatment plant is of very liquid consistency (99% water). In order to keep the transportation costs within limits it is necessary to carry out expensive dehydration processes.

One known process for the conversion of sludge to humus applies reeds (Phragmatis). These plants, however, are very expensive as they must be cultivated in bales. Furthermore, the strong stalks and roots of the reed require increased working before the converted sludge can be processed. Due to the regular filling with sludge in the known process the degree of complete drying of the converted sludge is relatively low. As the reed plants are used over the entire filling period of 10–15 years the percentage of decomposed plants is relatively low.

German Patent No. DE 43 23 610 describes a bio-polder (interim storage) for the biological clarification and/or mineralization of soil and sludge and for the biological clarification of waste water that is polluted by organic and inorganic substances. The bio-polder usually contains at least one aerobic and one anaerobic layer that lie on top of each other. The harmful substances that have not been eliminated in the aerobic layer are drawn into the anaerobic layer by gravity and are subjected to successive oxidative and reducing processes.

The invention is the result of the task to find a process for the conversion of sewage sludge to humus avoiding chemicals. This task is met for the process for the conversion of sludge to humus by the characteristics as stated in the describing part of claim 1.

Further development and advantageous arrangement of the invention arise from the further claims, the description, and the drawings.

SUMMARY OF INVENTION

The invented process for the conversion of sludge to humus is characterized by the following steps:
 a. Filling with liquid sewage sludge in a primary polder up to a primary filling height;
 b. Drying of the liquid sewage sludge preferably by drainage evaporation and/or discharge of the impounding water;
 c. Seeding of fast-growing plants with fine roots, preferably grass;
 d. Initiation of a growing phase of the plants for a stated period of time;
 e. Repetition of the preceding steps until the polder is filled completely; and
 f. Final resting of the sludge and emptying the polder.

The invented process is a low-cost process for the dehydration of sludge that in comparison to mechanical processes reduces the quantity of the sludge. The invented use of fast-growing plants with fine roots results in a fine and even root penetration, an accumulation of micro-organisms, and a reduction of harmful substances (a PCB—polycyclic biphenol, AOX, PAK).

In addition, the sludge that is covered with grass decompose in a shorter period of time than can be achieved by the known process with reed. Furthermore, the use of fast-growing plants with fine roots has the advantage that the low height of the plants favors ultraviolet radiation. This results in a remarkable reduction of salmonella or phatalates (softening agents) that are contained in the sludge. The degree of hyginisation is considerable.

The final product is dry, crumbly, dark-brown soil that is completely free of waste water odors and is characterized by good physical features for the improvement of soil. Furthermore, a remarkable reduction of the volume can be achieved.

Due to the use of fast-growing plants with fine roots cycles of the conversion can be achieved that are clearly shorter than by the known process with reed. In addition, the invented process is cost-saving compared to the known process.

Furthermore, the low depth of the filling layers and the long resting periods of the sludge result in a better aeration of the soil in the invented process.

In a further arrangement of the invented process, the single steps of the process are carried out in parallel in further polders. Thus, interruption of the filling process can be avoided. It is preferred to use three polders: The filling of liquid sewage sludge in polder I can be carried out at the same time as the drying of the sludge and the seeding with fast-growing plants with fine roots in polder II and the growing of the plants in polder III.

The plants can be mowed for an additional reduction of harmful substances. Harmful substances from the sewage sludge accumulate in the mowed grass and can be concentrated, for instance, by combustion. This results in a considerable reduction of e.g. heavy metals in the final product that has been converted to humus.

A polder for the invented process that is suitable for the carrying out of the invented process consists of waterproof side walls and a bottom plate. A pipe or surface drainage is installed above the bottom plate.

A further arrangement of the invented process provides for a polder that is suited for the invented process that contains a water blocking or hardly permeable layer towards the subsoil and the slopes. This layer can be made of clay or PE-foil. A pipe or surface drainage is installed above this layer and can be protected by a layer of pebbles with a cover of a mixture of minerals or permeable concrete stones. A sewer building with a gate valve that is connected to the polder should be provided for the discharge of impounding water. A waste water treatment plant is supplied by the drainage water and/or the impounding water over pipelines.

A further process engineering arrangement takes into consideration that under certain climatic conditions activated soil can lose the content of micro-organisms and its crumbly structure if kept airtight. In the invented process as described above a new layer of sludge and water is applied after the conversion to humus, so that the first layer is kept airtight until the new layer starts to dry and form cracks. This applies especially during longer periods of humid weather.

In order to maintain the good physical and biological consistency of the first layer, i.e. the layer flooded by a layer of sludge and water, the first layer, i.e. the flooded layer, can be moved to the slope at the side of the polder by appropriate tools, e.g. a caterpillar, after the conversion process of this layer. Thus, only a small portion of the converted substrate is flooded with water during the next filling period.

BRIEF DESCRIPTION OF DRAWINGS

The invention will be described in the following from the drawings.

DISCLOSURE OF INVENTION

Figure 1:
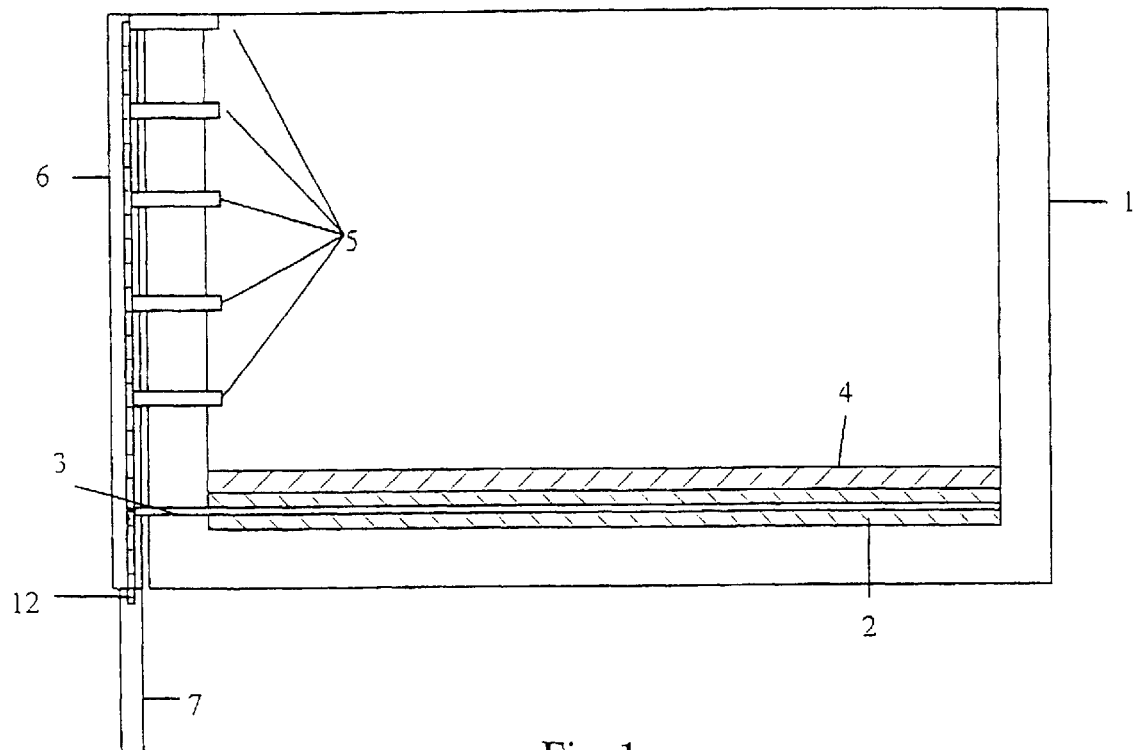
FIG. 1 is a first arrangement of an invented polder.

FIG. 1 shows a first arrangement of an invented polder 1. A polder 1 is constructed, for instance, with concrete walls. The bottom plate is equipped with a pipe or surface drainage 3 and covered by a layer of pebbles 2. This layer 2 is preferably covered by a mixture of minerals or concrete stones 4. A sewer building 6 with a gate valve 12 can be connected to the walls of the polder 1. In addition to the pipe or surface drainage 3, this sewer building 6 can supply a waste water treatment plant with impounding water. The gate valve 12 is lowered into a trap 7 for the regulation of the impounding water. The sewer building 6 can be connected to the drainage 3. A breakthrough 5 through the walls of the polder 1 leads the impounding water to the sewer building 6. The height of the breakthrough 5 can be changed by the gate valve 12.

Figure 5:
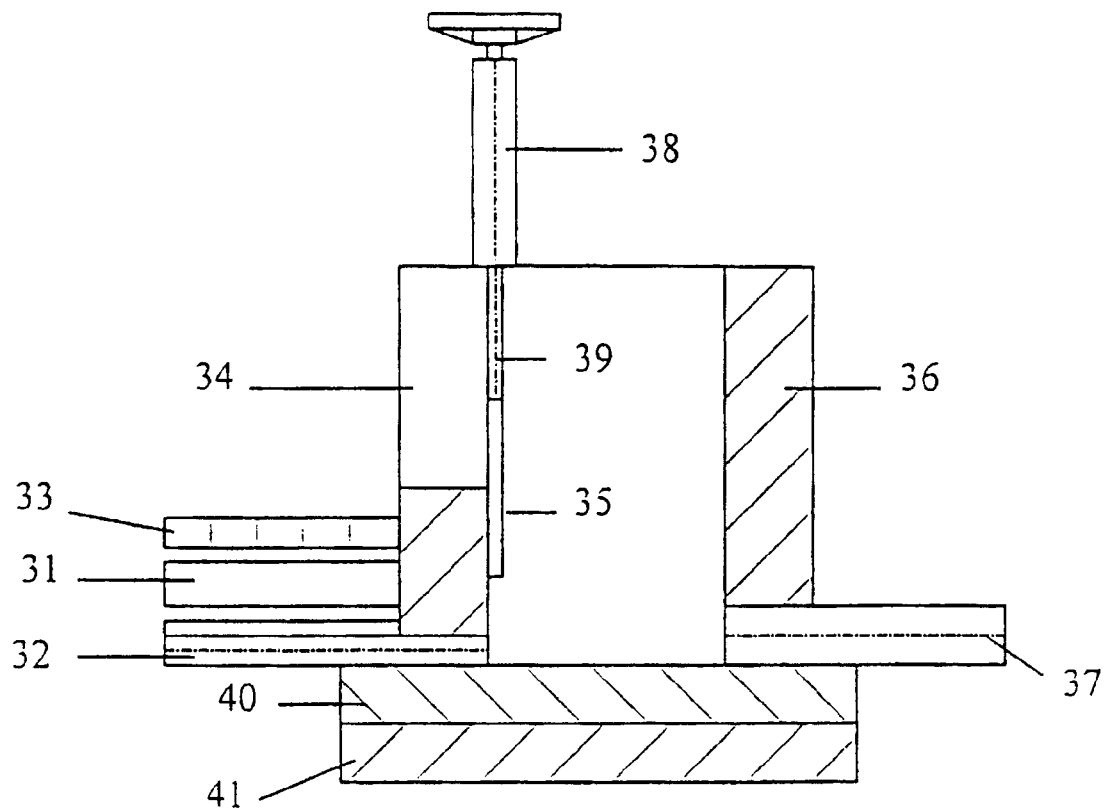
FIG. 5 illustrates a sewer building.
Figure 6:
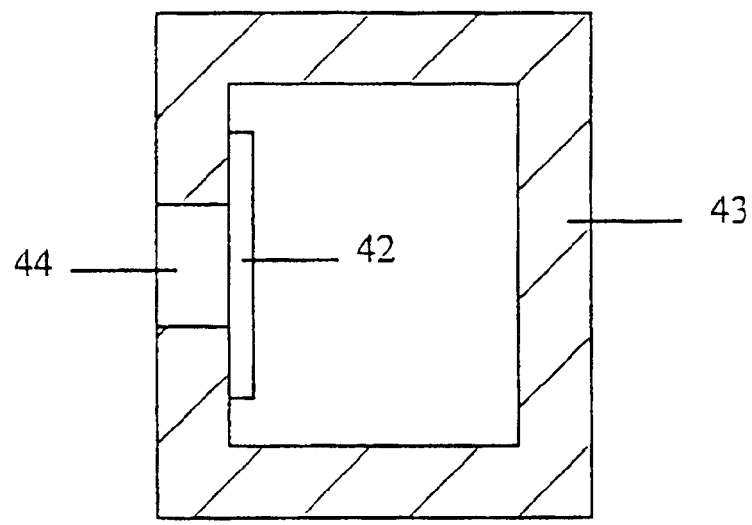
FIG. 6 illustrates a top view of the sewer building.

A possible arrangement of a sewer building 6 as described in FIG. 1 is depicted in FIG. 5 and FIG. 6. The sewer building 36 of FIG. 5 is rested on pedestals 40, 41. It is equipped with an outlet pipe 37 that is preferably connected to the successing waste water treatment plant the side of the sewer building that is opposite the outlet pipe 37 is connected to the interior of the polder. The polder is connected especially with a drainage pipe 32 to the sewer building 36. A layer of pebbles 31 and a (33) cover are installed above the drainage pipe 32. The sewer building 36 is equipped with an opening 34 towards the polder. The height of the opening 34 can be changed by a valve 35. The opening of the valve 35 can be changed by operating a valve 38, 39.

FIG. 6 shows a sewer building 43 in top view. The size of an opening 44 can be changed by a valve 42. The sewer building 43 is preferably constructed rectangularly.

Figure 2:
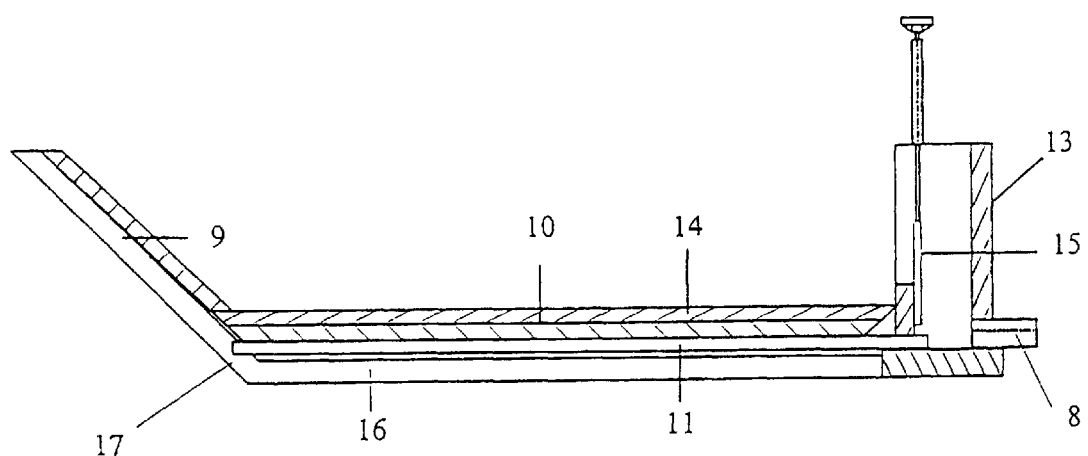
FIG. 2 is a second arrangement of an invented polder.

FIG. 2 shows a second arrangement of an invented polder 16. The polder 16 is equipped with a water blocking or hardly permeable layer towards the subsoil 17 and slopes 9. A pipe or surface drainage 11 is installed above this layer. The pipe or surface drainage 11 is protected by a layer of pebbles 10 with a cover 14 of a mixture of minerals or concrete stones. A sewer building 13 with gate valve 15 that is connected to the polder should be provided for the discharge of impounding water. A waste water treatment plant is supplied by the drainage water and/or the impounding water over pipelines 8.

Figure 3:
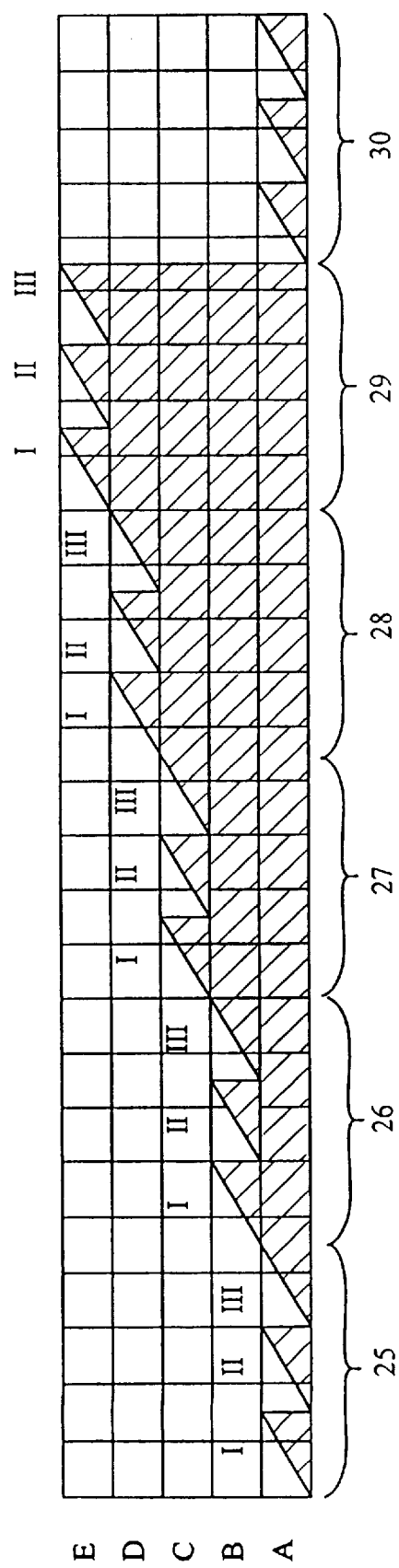
FIG. 3 illustrates a filling cycle.

FIG. 3 shows the complete filling cycle 25 to 30. During the first cycle 25, polder I is filled with sewage sludge up to height A. In the same period that polder II is filled with sewage sludge, a reduction of the water content of the liquid sludge—preferably by drainage, evaporation, and/or discharge of the impounding water—and the seeding with fast-growing plants with fine roots - preferably grass—together with the initiation of the growing period is carried out in polder I. After polder II is filled with sewage sludge, polder m is filled with sewage sludge up to height A. The plants in polder I are subjected to a period of growth whereas a reduction of the water content as well as the seeding and the initiation of the growing period takes place in polder I. That concludes the first cycle. Each polder I–III requires approximately 12 months for one cycle. The cycle can be shortened or extended according to the circumstances, e.g. weather. Cycle 25 is followed by further cycles 26 to 29 up to the respective filling heights B to E until the polders I–III have been filled completely. Then the maximum filling height of the polders I–III has been reached. The final filling cycle 29 is followed by another cycle 30. In that cycle 30 the sludge is either stored or the polders I–III are emptied and filled anew.

Figure 4:
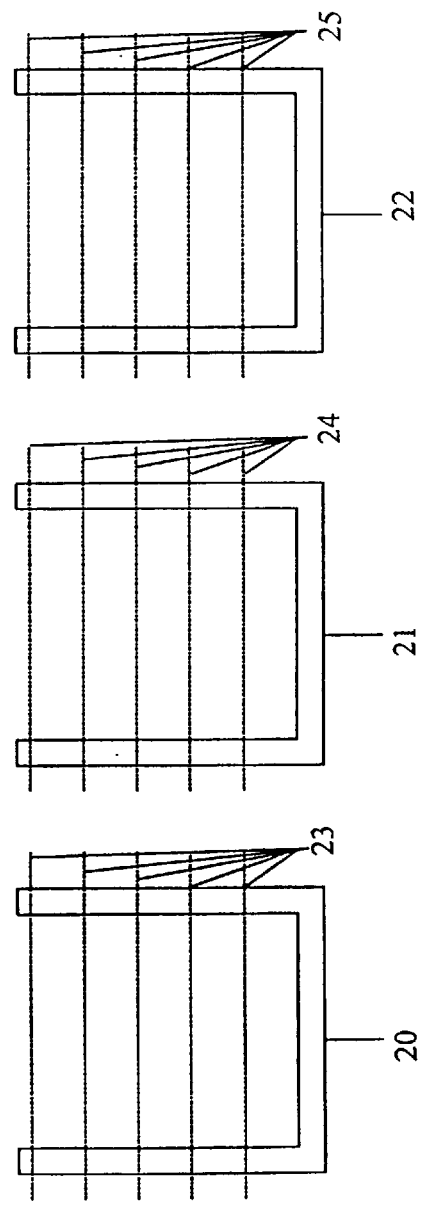
FIG. 4 illustrates an arrangement of polders.

FIG. 4 shows the arrangement with 3 polders 20 to 22. The depths of the layers 22 to 25 are stated. Due to the proceeding conversion to humus and the resulting reduction of quantity, they do not turn out to be that deep, however.

The invention is not restricted to the examples described. The invented solution covers the use of one polder only or of more than three polders. The polders that have been described as examples have not yet been described finally, either. Their arrangement and design can be modified by using other designs, for instance, of the drainage, the cover, or the sewer building, or by not using single elements.

What is claimed is:

1. A process for the conversion of sewage sludge to humus, including the following steps:

a. filling with liquid sewage sludge in a primary polder up to a primary filling height;

b. dehydration of the liquid sewage sludge preferably by drainage, evaporation, or discharge of the impounding water;

c. seedlings of fast-growing plants with fine roots;

d. initiation of a growing phase of the plants for a stated period of time or up to a stated degree of growth;

e. repetition of the preceding steps until the polder is filled completely; and f. final resting of the polder and emptying of the polder.

2. Process as defined in claim 1, wherein the steps of the process are carried out in additional polders, but in a changed order of rank.

3. Process as defined in claim 1, wherein the plants are mowed for a reduction of harmful substances and the mowed grass is stored separately or exterminated.

4. Polder to carry out the process as defined in claim 1, characterized by the fact that the sidewalls and bottom plates of polder are constructed waterproof, that a pipe or surface drainage is installed above the bottom plate that can be protected by a foyer of pebbles with a cover of a mixture of minerals or permeable concrete stones, that a sewer building with a gate valve for the discharge of the impounding water is connected with the polder and that a waste water treatment plant is supplied with the drainage water or impounding water over pipelines.

5. Polder to carry out the process as defined in claim 1, characterized by the fact that the polder is equipped with a water blocking or hardly permeable layer towards the subsoil and the slopes, that a pipe or surface drainage is installed above the subsoil or toward the slopes that can be protected by a layer of pebbles with a cover of a mixture of minerals or permeable concrete stones, that a sewer building with a gate valve for the discharge of the impounding water is connected with the polder, and that a waste water treatment plant is supplied with the drainage water or impounding water over pipelines.

\* \* \* \* \*